United States Patent [19]

Kondo

[11] Patent Number: 4,661,857

[45] Date of Patent: Apr. 28, 1987

[54] FACSIMILE COMMUNICATION CONTROL METHOD

[75] Inventor: Mitsuru Kondo, Sagamihara, Japan

[73] Assignee: Ricoh Company, Ltd., Tokyo, Japan

[21] Appl. No.: 522,039

[22] Filed: Aug. 10, 1983

[30] Foreign Application Priority Data

Aug. 11, 1982 [JP] Japan ............................. 57-139590

[51] Int. Cl.[4] ............................................. H04N 1/32
[52] U.S. Cl. .................................. 358/257; 358/260; 358/288; 382/56
[58] Field of Search ............... 358/260, 261, 268, 288, 358/257, 133; 382/56

[56] References Cited

U.S. PATENT DOCUMENTS 4,090,222  5/1978  Nakagome et al. ................. 358/261
4,386,373  5/1983  Kondo et al. ....................... 358/261

Primary Examiner—Edward L. Coles, Sr.
Attorney, Agent, or Firm—Oblon, Fisher, Spivak, McClelland & Maier

[57] ABSTRACT

A control method for controlling a facsimile communication between a transmitter and a receiver is provided. During protocol procedure, information including decoding speed and capacity of a buffer memory is supplied from the receiver to the transmitter. Then, during data transmission, the transmitter controls the encoding speed to be equal to or smaller than the decoding speed at the receiver by inserting an appropriate number of fillbits, and the encoding operation is interrupted, resumed or a predetermined number of fillbits are inserted depending upon the number of bits stored in the buffer memory of the receiver.

5 Claims, 3 Drawing Figures

FACSIMILE COMMUNICATION CONTROL METHOD

BACKGROUND OF THE INVENTION

1. Field of the Invention

This invention generally relates to a communication control method, and in particular to a facsimile communication control method for controlling communication of image information between a facsimile transmitter and a facsimile receiver.

2. Description of the Prior Art

In facsimile communication, as the transmission rate of data increases, transmission time required for transmitting data decreases. However, since response speed is limited by the minimum scanning time of a facsimile receiver, i.e., recording speed of a recorder, there is an upper limit in transmission rate even if data are to be transmitted as band-compressed in the form of codes using a coding technique such as M.H. (Modified Huffman) coding system.

FIG. 1 illustrates in block diagram the main structure of a typical facsimile system which processes image information. As shown, the system is comprised of a transmitter section, which is shown as an upper half, and a receiver section, which is shown as a lower half. The transmitter section includes a reader 11 for reading an original to be transmitted, thereby converting optical image information into electrical image information which is comprised of binary data, an encoder 12 for encoding the binary image data supplied from the reader 11, a buffer memory 13 for temporarily storing data to be transmitted and a MODEM 14 for modulating the data to be transmitted. On the other hand, the receiver section includes a recorder 21 for recoding transmitted image information on a recording medium, a decoder 22 for decoding the coded data as transmitted from the transmitter, a buffer memory 23 for temporarily storing data and a MODEM 24 for demodulating the data received as transmitted from the transmitter. Also shown in FIG. 1 is "$M_T$" indicating the capacity of the memory 13 and "$M_R$" indicating the capacity of the memory 23.

The reader 11 scans an original to be transmitted thereby obtaining electrical image information in the form of the binary data, i.e., 0's and 1's, which is then supplied to the encoder 12 comprised, for example, of a microprocessor. The encoder 12 carries out coding of the binary image data according to the Modified Huffman system while controlling the operation of the buffer memory 13. In this instance, the encoder 12 carries out control such that encoded image data may be supplied to the MODEM 14 from the buffer memory 13 in accordance with data transfer clock pulses at the MODEM rate supplied from the MODEM 14.

At the receiver side, the encoded data received as transmitted from the transmitter is demodulated by the MODEM 24 and then thus demodulated data is temporarily stored into the buffer memory 23. The decoder 22 is, for example, comprised of a microprocessor and it functions such that the encoded data temporarily stored in the buffer memory 23 is decoded to recover the original image information in the form of the binary values, which is then supplied to the recorder 21.

In a facsimile communication system as shown in FIG. 1, image signal processing has been conventionally controlled to satisfy the relation of $$V_S > T_{MIN} \quad (1)$$

where,
$T_{MIN}$: minimum transmission time per line (sec/line), and
$V_S$: reading speed of reader 11 (sec/line).

Moreover, the following relations must be satisfied.

$$V_e \times V_m \geqq T_{MIN} \quad (2)$$

where,
$V_e$: encoding speed per line (sec/line), and
$V_m$: MODEM rate (bps);

$$V_d \geqq V_e \quad (3)$$

where,
$V_d$: decoding speed of decoder 22, and
$V_e$: encoding speed per line; and $$V_P \geqq V_S \quad (4)$$

where, $V_P$: recording speed of recorder 21 (sec/line).

In prior art facsimile communication systems, control has been carried out such that the above four relations be satisfied.

Under the condition, in which the Modified Huffman coding system is used with constant MODEM rate $V_m$, in order to shorten the transmission time $T_{MIN}$ in each of the relations (1) and (2) must be made smaller. In order to keep $T_{MIN}$ smaller, $V_S$ and $V_P$ in the above inequality equations (1) and (4) must be made larger. In other words, it is required to make the reading speed $V_S$ of the reader 11 faster, so does the recording speed $V_P$ of the recorder 21, which then would bring about other problems of making the system bulky and pushing up the cost.

With the reading speed $V_S$ and recording speed $V_P$ at constant, even if the encoding speed $V_e$ or decoding speed $V_d$ were increased, the overall transmission speed of the system would not be improved and there will be a fixed upper limit. Under the circumstances, even if transmission of data is carried out at a speed exceeding such an upper limit, it is useless because the receiver cannot respond. As a result, data transmission must be carried out with insertion of fillbits, which rather destroys the idea of shortening transmission time.

For example, in a facsimile system in which data is transmitted as band-compressed with a plurality of lines as a block, designating the time required to record one block of data by the receiver by $T_1$ and the time required to transmit such a block of data by $T_2$, it is often so controlled to hold the relation that $T_1$ is equal to or larger than $T_2$ with the insertion of appropriate number of dummy bits at the transmitter side. In this manner, transmission time $T_2$ is required to be larger than recording time $T_1$. For this reason, if the compression rate of data is high, a larger number of dummy bits are required to be transmitted, and, as a result, transmission time is very little reduced.

Instead of inserting an appropriate number of fillbits so as to keep the minimum transmission time per line as described above, another prior art approach is to provide a buffer memory between the decoder and demodulator MODEM of receiver to control the insertion of fillbits by sending a signal to the transmitter whenever the buffer memory of receiver is about to overflow, or, alternatively, by carrying out calculation at the transmitter side so as not to overflow the buffer memory of the receiver side. These prior art methods allow to reduce the total number of fillbits to be inserted, thereby permitting to shorten transmission time. However, difficulties will be encountered in practice if an attempt is made to carry out control so as not to overflow the buffer memory of receiver.

As described above, in the prior art methods, an attempt to increase reading speed $V_S$ or recording speed $V_P$ to shorten transmission time necessarily caused increases in device size as well as in cost. The prior art methods are also disadvantageous because a simple increase in encoding and/or decoding speeds, which can be realized relatively easily, does not lead to a reduction in transmission time.

SUMMARY OF THE INVENTION

The disadvantages of the prior art are overcome with the present invention and an improved facsimile communication system is hereby provided. In accordance with a facsimile communication control method for controlling communication between a transmitter and a receiver including a buffer memory embodying the present invention, during protocol procedure, information containing at least decoding speed $V_D$ of a decoder and memory capacity $M_R$ of a buffer memory of the receiver is supplied to the transmitter, and, during transmission of image information, the transmitter carries out insertion of an appropriate number of fillbits such that an encoding speed does not exceed the decoding speed $V_D$ such that when the contents of the buffer memory of the receiver or the number of bits of encoded data stored therein have exceeded a first amount $M_1$ ($M_1 \leq M_R$), the encoding operation is interrupted; when the number of bits has become smaller than a second amount $M_2$ ($M_2 < M_1$), the encoding operation being interrupted is resumed; and when the number of bits has become even smaller than a third amount $M_3$ ($0 \leq M_3 \leq M_2$), a predetermined number of fillbits are inserted.

In the preferred embodiment of the present invention, a minimum transmission time period per line is determined and it is so controlled that such a time period corresponds in length to a decoding time period per line at the receiver.

It is therefore a primary object of the present invention to provide an improved facsimile communication control method.

Another object of the present invention is to provide a novel facsimile communication control method capable of preventing a buffer memory of a receiver from overflowing assuredly.

A further object of the present invention is to provide a facsimile communication control method capable of shortening transmission time simply by increasing encoding and decoding speeds.

A still further object of the present invention is to provide a facsimile communication method capable of implementing communication even between a transmitter and a receiver which are different in buffer memory capacity as well as in decoding speed.

A still further object of the present invention is to provide a facsimile communication control method which may be easily implemented in various kinds of facsimile machines.

Other objects, advantages and novel features of the present invention will become apparent from the following detailed description of the invention when considered in conjunction with the accompanying drawings.

DESCRIPTION OF THE PREFERRED EMBODIMENTS

Figure 1:
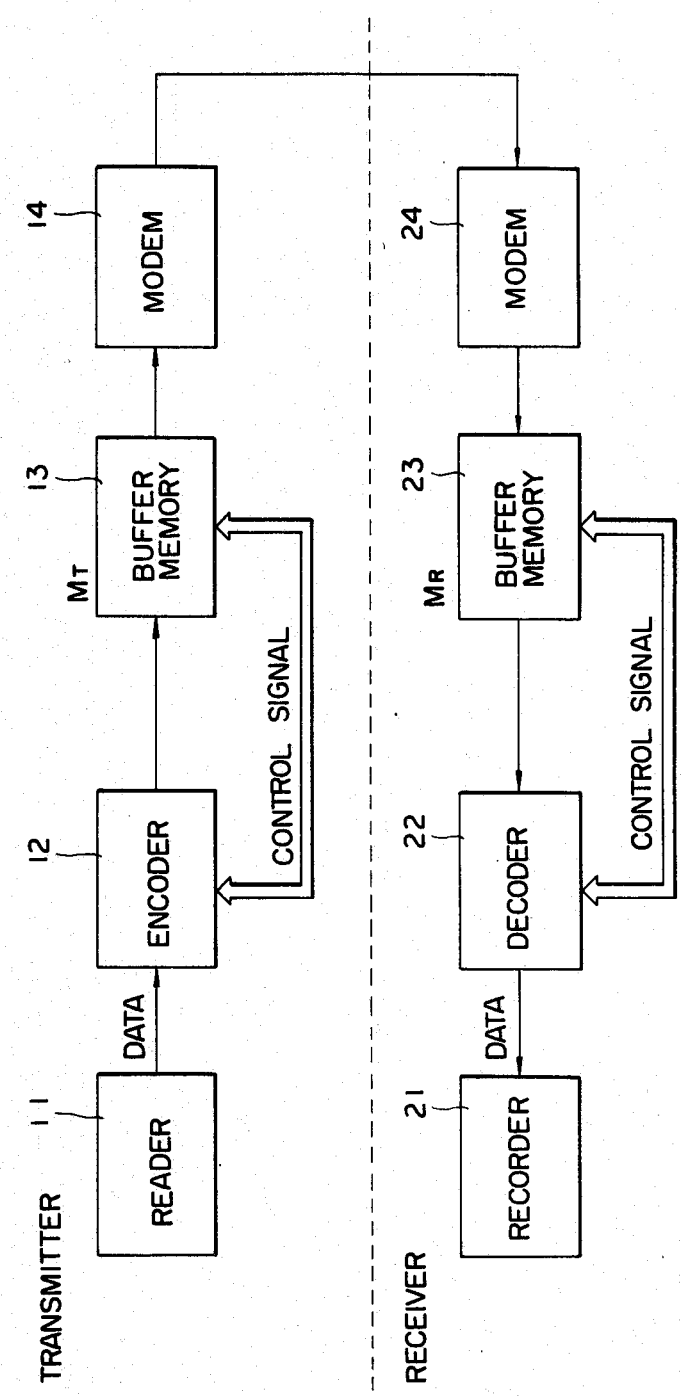
FIG. 1 is a block diagram showing the main structure of a facsimile communication system, which carries out image information processing.

The facsimile communication control method of the present invention may be applied to the structure shown in FIG. 1. Although various kinds of encoding systems may be applied to the present invention, the Modified Huffman system will be assumed in the following description.

It is to be noted that operating conditions of various components of the facsimile communication system should be set to hold the following relations.

$$V_d > V_P \quad (5)$$

$$V_e > V_S \quad (6)$$

where, $V_d$: decoding speed; $V_P$: recording speed; $V_e$: encoding speed per line; and $V_S$: reading or scanning speed per line.

It is to be also noted that since strict restraints are absent in the present method, the capacity or memory size $M_T$ of the buffer memory 13 at the transmitter side may be of ordinary one.

Figure 2:
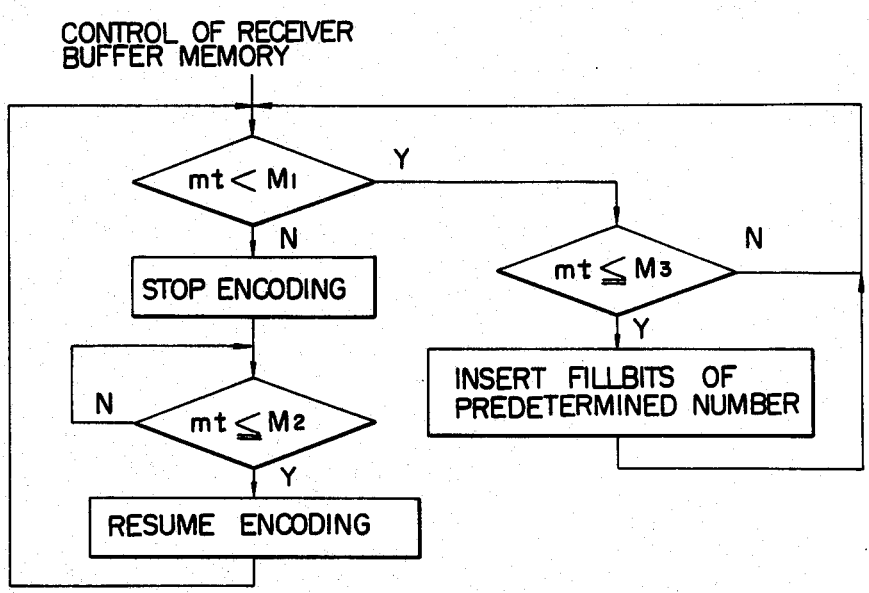
FIG. 2 is a flow chart showing the operation of controlling the buffer memory of the receiver in accordance with the present facsimile communication control method.
Figure 3:
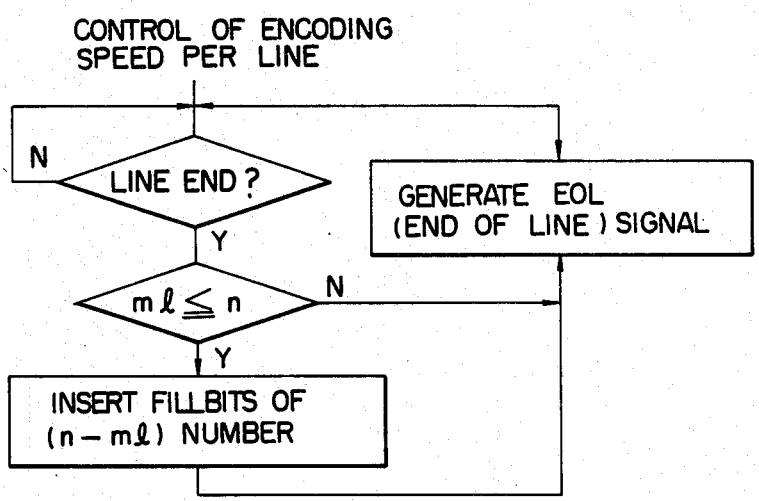
FIG. 3 is a flow chart showing the operation of controlling the encoding speed per line in accordance with the present facsimile communication control method.

FIG. 2 shows a flow chart illustrating the control operation of the buffer memory at the receiver side in accordance with the present facsimile communication control method, and FIG. 3 shows a flow chart illustrating the operation for controlling the encoding speed per line. In FIGS. 2 and 3, mt indicates the number of bits of encoded data temporarily stored in the buffer memory 13 at the transmitter side; ml indicates the number of bits of encoded data per line; n indicates the allowable minimum number of bits to be transmitted per line which is determined by a MODEM rate and a decoding speed at the receiver; and $M_1$ through $M_3$ indicate the amount of data stored in the buffer memory 23 at the receiver side with a relation of $0 \leq M_3 < M_2 < M_1 \leq M_R$. It should further be noted that EOL indicates an end-of-line code, and the relation of $n = V_d \times V_m$ holds.

In accordance with an embodiment of the present control method, the encoder 12 carries out a coding operation according to the Modified Huffman system while controlling the operation of the buffer memory 13 at the transmitter side, as shown in FIG. 2. Described in detail, it is so controlled that the bit number mt of encoded data stored in the buffer memory 13 does neither go above the first amount $M_1$ of the buffer memory 23 at the receiver side nor go below the third amount thereof. When the bit number mt has become smaller than the third amount $M_3$, a predetermined number of fillbits are inserted thereby allowing to maintain the bit number mt above the third amount $M_3$. It is to be noted that each of the fillbits has the logic "0" in the Modified Huffman system. On the other hand, when the bit number mt has exceeded the first amount $M_1$, the encoding operation is interrupted; whereas, when the bit number mt has become smaller than the second amount $M_2$, the encoding operation is resumed.

At the same time, the encoder 12 also carries out a control operation such that encoded data may be supplied from the buffer memory 13 to the MODEM 14 in accordance with the data clock transfer clock pulses having the demodulation rate supplied from the MODEM 14. In this instance, every time when the encoder 12 supplies encoded data to the MODEM 14, the encoder 12 controls its encoding speed in accordance with the sequence illustrated in FIG. 3. That is, it is so controlled that the bit number m1 of the encoded data per line does not become smaller than the allowable minimum number n of bits to be transmitted. And, if it does, fillbits comprised of ( n-m1 ) number of bits are inserted so as to maintain m1 larger than n.

In this manner, in accordance with the present invention, since the encoding speed per line is so controlled not to exceed the decoding speed at the receiver side, the time for carrying out a decoding operation per line can be guaranteed.

In the embodiment described above, the encoding speed is controlled on the basis of the decoding speed $V_d$ per line. However, it is also possible to control the encoding speed on the basis of the decoding speed per block comprised of a predetermined number of lines, and such a structure also comes within the scope and spirit of the present invention.

As set forth in detail above, in accordance with the present invention, facsimile communication control can be carried out without causing overflow in the buffer memory 23 at the receiver and simply by inserting a minimum number of fillbits determined by the decoding speed $V_d$ at the receiver side and the capacity $M_R$ of the buffer memory 23, so that an average encoding speed may be obtained even between a plurality of lines different in density, thereby allowing to reduce time of transmission and to obtain a high-speed operation.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for controlling a facsimile communication between a transmitter including an encoder and a receiver including a buffer memory and a decoder, characterized in that, during protocol procedure, information containing at least a decoding speed $V_D$ of said decoder of said receiver and a capacity $M_R$ of said buffer memory of said receiver is supplied from said receiver to said transmitter, and, during transmission of data, said transmitter controls an encoding speed of its encoder to be equal to or slower than $V_D$ by inserting an appropriate number of fillbits and it is so controlled to interrupt the encoding operation when the number of bits stored in said buffer memory of said receiver has exceeded a first amount $M_1$ ($M_1 \leq M_R$), to resume the encoding operation when said number of bits has become smaller than a second amount $M_2$ ($M_2 < M_1$) and to insert a predetermined number of fillbits when said number of bits has become even smaller than a third amount $M_3$ ($0 \leq M_3 < M_2$).

2. A method of claim 1 wherein a minimum transmission time per line is appropriately determined and the decoding speed of said decoder of said receiver is set to be in correspondence in length with said minimum transmission time.

3. A method of claim 1 wherein the encoding speed of said encoder differs from the decoding speed of said decoder.

4. A method of claim 1 wherein said transmitter also includes a buffer memory.

5. A method of claim 4 wherein said buffer memory of said transmitter is different in capacity from said buffer memory of said receiver.

* * * * *